April 21, 1970     D. E. MARPE     3,508,159
AMPLITUDE CONTROL CIRCUIT
Filed Sept. 27, 1967     6 Sheets-Sheet 1

INVENTOR.
DONALD E. MARPE
BY
Dugger, Peterson, Johnson & Westman
ATTORNEYS

United States Patent Office 3,508,159
Patented Apr. 21, 1970

3,508,159
AMPLITUDE CONTROL CIRCUIT
Donald E. Marpe, Bloomington, Minn., assignor to MTS Systems Corporation, Minneapolis, Minn., a corporation of Minnesota
Filed Sept. 27, 1967, Ser. No. 670,977
Int. Cl. H03b 3/02
U.S. Cl. 328—168                                    12 Claims

ABSTRACT OF THE DISCLOSURE

A materials test system involves the measurement of the force applied to the specimen by means of a load cell and suitable transducer conditioning circuitry so as to obtain an output voltage which is proportional to the applied force. An amplitude control circuit compares the peak-to-peak amplitude or span of the transducer output voltage with a reference voltage which is proportional to the desired amplitude of applied force. If the transducer output voltage span is not equal to the reference voltage, the amplitude control circuit applies a proportional correction signal to a load controller which will either decrease or increase the amplitude of the applied force as required. The amplitude control circuit allows the system to be operated in either a resonant or non-resonant mode.

CROSS-REFERENCE TO RELATED APPLICATION

Since my invention possesses especial utility in a materials testing system because of the precision control it is capable of exerting, an attempt will be made herein to describe a typical materials testing system in a general fashion, yet in sufficient detail to afford an appreciation of the benefits to be derived from my invention. If further background information is necessary, reference can be made to a copending application titled "Servo Valve Controlled Hydraulic Resonant Machine, Ser. No. 543,-696, filed Apr. 19, 1966, now U.S. Patent No. 3,442,120 and assigned to the same assignee as the instant application.

BACKGROUND OF THE INVENTION

Field of the invention

This invention relates generally to electrical control systems, and pertains more particularly to a circuit which provides an output voltage signal representative of the peak-to-peak amplitude of a time varying (usually sinusoidal) input voltage signal.

DESCRIPTION OF THE PRIOR ART

Prior methods of amplitude control have obtained a proportional correction signal by means of amplification and rectification of the two signal voltages representing the command signal and the controlled parameter. The inherent system requirement for control with a minimum error voltage implies a high degree of filtering of the two rectified voltages which are summed to form the proportional correction signal. This necessary filtering involves large circuit time constants which greatly increase the response time of the amplitude control circuit. In addition, certain circuit design problems arise because of the high impedance levels required.

The two above mentioned problems associated with the prior art are essentially eliminated by the amplitude control circuit described in this disclosure.

SUMMARY OF THE INVENTION

Particularly in a materials testing system, a hydraulic fluid flow is regulated with a servovalve into a hydraulic actuator to apply force to the specimen in proportion to the differential pressure in the actuator. Since it is the function of the servovalve and other controls to control the force on the specimen irrespective of actuator friction forces, actuator leakage, specimen changes, etc.; an accurate sensing of the force being applied is essential. A signal measured from the maximum peak to the minimum peak of a time varying signal generated by the transducer associated with the test specimen will provide the basis for a precise degree of control that can be exercised over the force being repeatedly applied to the specimen. Accordingly, the present invention has for an object the provision of a circuit that will produce a signal truly representative of the peak-to-peak amplitude of a time varying quantity. Also, particularly in a materials testing system where the measured friction may be distorted and have an unsymmetrical wave shape, provision is made for obtaining an average of the maximum and minimum peaks.

DESCRIPTION OF THE PREFERRED EMBODIMENT

Figure 1:
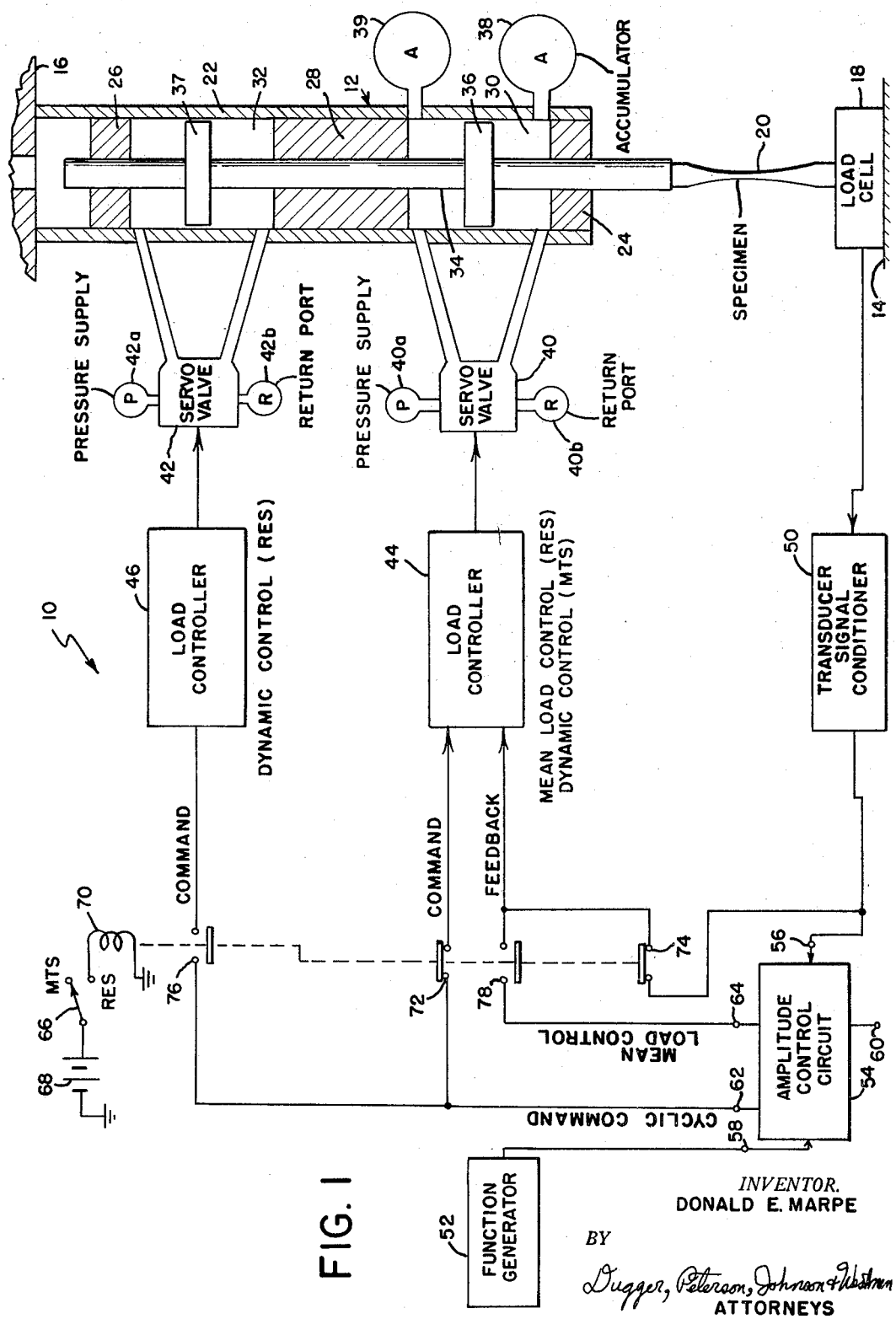
FIGURE 1 is a block diagram illustrating a typical materials testing system in which my amplitude control circuit is embodied, such circuit being depicted as a single block.

Before describing my amplitude control circuit, it will be of assistance to refer to a typical materials testing system which has been designated in its entirety by the reference numeral 10 in FIGURE 1. If additional information is desired, the hereinbefore alluded-to patent application for "Servo Valve Controlled Hydraulic Resonant Machine" can be referred to. The materials testing system 10 comprises a testing machine or apparatus 12 which for the sake of simplicity can be regarded as residing intermediate a lower rigid body or floor 14 and an upper rigid body or ceiling 16. A load cell 18 serves as the transducer for determining the amount of actual force applied to the metallic specimen 20 which has an inherent amount of elasticity. Upper and lower specimen grips and resonant mass have been omitted in this instance.

The apparatus 12 further includes a cylinder 22 having a closed lower end 24, a closed upper end 26 and an intermediate partition 28. In this way, a lower chamber 30 is provided and an upper chamber 32 is formed. Vertically reciprocable in the cylinder 22 is a piston rod 34 having a lower piston 36 contained in the chamber 30 and an upper piston 38 contained in the chamber 32. Hydraulic accumulators 38 and 39 act as a soft hydraulic spring in chamber 30 to allow dynamic movement of piston 36 with a minimum of alternating pressure in chamber 30.

Included in a system 10 of the envisaged type is a mean load servovalve 40 having a pressure supply 40*a* and a return port 40*b* and a dynamic servovalve 42 having a pressure supply 42*a* and a return port 42*b*. The servovalve 40 is connected to a first load controller 44 and the servovalve 42 is connected to a second load controller 46. As the description progresses, it will become evident that it is the function of the valves 40 and 42 to control a predetermined hydraulic flow into cylinders 30 and 22, which produces a differential pressure across cylinders 36 and 37 that applies force to the specimen 20 through piston rod 34 at a controlled rate. It will be appreciated by those familiar with the materials testing art that the servovalve 40 will be quite large, whereas the servovalve 42 will be considerably smaller. It might be briefly explained at this stage that servovalve 40 controls the mean load, the accumulators 38 and 39 isolating the dynamic flow, and servovalve 42 controls the dynamic load.

It has already been pointed out that the load cell 18 serves as the transducer for providing an indication of the amount of force applied by the machine 12 to the specimen 20. In order to transform the signal derived from the load cell 18 into an output voltage which is proportional to the applied force, a transducer signal conditioner 50 is employed in the system 10. The output from the transducer signal conditioner 50 constitutes a feedback voltage which will be dealt with more extensively hereinafter. Also included in the system 10 is a function generator 52 which provides the basic command signal input.

Having made reference to the various components hereinbefore enumerated, the environment has been specifically set for an understanding of the benefits to be derived from my amplitude control circuit which has been illustrated in block form by the numeral 54 in FIGURE 1. From FIGURE 1, it will be discerned that the amplitude control circuit has a number of principal terminals that should be referenced at this time. The first such terminal carries the numeral 56 and it will be seen that the output of the transducer signal conditioner 50 is connected directly to this terminal. A second terminal 58 has the function generator 52 connected thereto. A third terminal 60 has a reference voltage applied thereto. Two output terminals 62 and 64 are also associated with the circuit 54.

Prior to explaining the connections to the terminals 62, 64, it will be well to refer to a selector switch 66 which can be manually moved into either of two positions. In the position in which it appears, it is set for a non-resonant mode operation, whereas when lowered to its second position, it is set for causing the system 10 to operate at a resonant frequency. The switch 66 is connected in circuit with a source of power 68 and a relay 70 having a first set of normally closed contacts 72 which establish an electrical path from the output terminal 62 to the load controller 44. The relay 70 has a second set of normally closed contacts 74 which apply the signal from the transducer signal conditioner 50 to a second input to the load controller 44. On the other hand, a third set of contacts 76 are normally open but when closed connect the terminal 62 directly to the load controller 46, and a fourth set of normally open contacts connect the output terminal 64 of the circuit 54 to the load controller 44.

A detailed description will now be given for the amplitude control circuit 54 and attention should be directed to FIGURE 2. Since the voltage signal from the transducer signal conditioner 50 is a time varying one, it is constituted of both maximum and minimum peaks. To obtain direct current voltages which correspond to the peaks of the feedback voltage delivered from the conditioner 50 of FIGURE 1, a set of peak detector circuits 81, 82, 83 and 84 are employed. The detectors 81–84 each have a pair of inputs and an output and the detectors 82, 84 are equipped with a gate terminal in addition. More specifically, it will be seen that the detector 81 has a first input 81a, a second input 81b and an output 81c. The other detectors 82, 83 and 84 have corresponding inputs 82a, 83a, 84 and inputs 82b, 83b, 84b and outputs 82c, 83c, 84c. In addition, the detectors 82 and 84, have gate terminals 82d and 84d, respectively.

At this time, it can be mentioned that the detector 83 is the complement of the detector 81 and that the detector 84 is the complement of the detector 82; however, this complemental relationship is better understood from the schematic diagrams set forth in FIGURES 4–6 which will be referred to in detail hereinafter.

Since the feedback signal from the transducer signal conditioner 50 which is applied to the terminal 56 is impressed on the various inputs 81a, 82a, 83a and 84a, it should be pointed out that it is the purpose or function of the detector 81 to provide a negative pulse at its output 81c whenever the voltage impressed on the input 81a is greater than a reference voltage applied to the input 81b of the detector 81. Similarly, the detector 82 functions so as to provide a positive pulse at its output 82c whenever the voltage impressed on its input 82a is less than the said reference voltage which is also applied to the other input 82b of the detector 82. It should be clear from what has been said that the feedback voltage impressed on the terminal 56 is in turn impressed on all of the first inputs of the various detectors 81–84. Thus, it can be seen that it is the role of the detectors 81, 82 to process the maximum peaks.

It has been mentioned above that a reference voltage is applied to each of the inputs 81b, 82b. However, the manner in which this reference voltage is obtained will now be described. To understand how this reference voltage is obtained, it should be noted that the outputs 81c, 82c are tied together and then connected to a peak integrator 86 which includes a resistor 87, a capacitor 88 and amplifier 89. The voltages appearing at the outputs 81c, 82c are algebraically summed to form the input signal for the peak integrator 86; the output signal from the peak integrator 86, however, is applied to the inputs 81b, 82b as the aforementioned reference voltage. While the word "summed" has been used, this is not strictly an appropriate term, for it will be appreciated that only the detector 81 or the detector 82 can theoretically have an output at any one time. Similarly, the outputs 83c, 84c are connected together, and the junction thus formed connected to a peak integrator 90 like the integrator 86, the integrator 90 including a resistor 91, a capacitor 92 and an amplifier 93.

Time constants of the integrator circuits 86, 90 are preferably chosen to provide an integration rate which allows amplitude correction to follow moderate amplitude changes with each cycle. It will be seen that this results in obtaining two voltages, more specifically, two reference voltages, which correspond to the peak amplitudes of the incoming signal at terminal 56, with no time lag when changes occur.

Before proceeding further with the description of the manner in which signals are processed via the detectors 81, 82 and the peak integrator 86, it will be well to refer to a phase shift integrator 94 that is electrically connected to the terminal 56, this integrator including a resistor 95, a capacitor 96 and an amplifier 97. A pulse shaper 98 has its input connected to the integrator 94 and its output is connected directly with the gate terminals 82d and 84d. What occurs is that the feedback signal delivered to the terminal 56, which signal serves as an input voltage for the detectors 81–84, is integrated by means of the integrator 94 to provide a 90° phase shift. The pulse shaper 98 contains a gain stage in front of a Schmitt trigger circuit and a differentiating circuit is connected to the output of the Schmitt trigger. In this way, narrow gating pulses are generated which occur simultaneously with the amplitude peaks of the input or feedback signal and these are used to gate the detectors 82 and 84.

For the moment, we will be concerned with only the role played by the detectors 81 and 82. It will be appreciated that the voltage at the output 81c is a negative pulse whose amplitude and width are dependent upon the degree to which the feedback signal exceeds the reference signal applied to the inputs 81b and 82b. If the feedback or input voltage is less than the reference voltage, the output signal from detector 81 will be zero volts. Inasmuch as the signal from the pules shaper 98 is a narrow gating pulse, which is explained above, and coincides with the amplitude peaks, the output voltage from detector 82, at the output 82c, is a positive voltage pulse whose amplitude is dependent upon how much less in magnitude the maximum peak of the feedback voltage is than the reference voltage applied to the input 82b. The maximum width of this positive pulse will correspond to the width of the gating pulse which allows the detector 82 to sense the peak amplitude of the feedback voltage. If the maximum peak has a value greater than the reference voltage impressed on the input 82c, the output of this detector 82 will be zero volts.

Recapitulating for a moment, the detector 81 generates a negative output pulse whenever the feedback signal at the terminal 56 has a maximum peak exceeding the value of the reference voltage from the integrator 86, and by the same token, the detector 82 puts out a positive pulse whenever the maximum peak of the feedback voltage is less in magnitude than this same reference voltage.

With the foregoing in mind, the functioning of the peak integrator 86 can be easily understood. If the input or feedback voltage is greater, or becomes greater, than the output signal from the integrator 86, the negative output voltage obtained from the detector 81 will cause the integrator 86 to integrate in a positive direction, thus increasing the magnitude of the reference voltage to the detector 81, more specifically, its input 81b (and also to the input 82b of the detector 82). This, in turn, will reduce the error or difference signal at the output 81c of the detector 81 until a balance condition is obtained which occurs when the output signal of the integrator 86 has for all intents and purposes attained the same magnitude as the maximum peak voltage of the feedback or input voltage signal. If the input feedback voltage is less, or becomes less, than the output signal of the integrator 86, the positive output voltage obtained at the output 82c of the detector 82 will result in the integrator 86 integrating in a negative direction until a balanced condition is reached under these circumstances, which is again the point at which the integrator output voltage is virtually equal to the feedback maximum peak voltage.

For the lack of better descriptive language, the detector 81 can be succinctly termed an "upper peak greater than" detector, whereas the detector 82 can be termed an "upper peak less than" detector. Whenever the upper or maximum peaks are "greater than" the referenced signal returned from the integrator 86, a negative voltage appears at the output 81c, whereas whenever the upper or maximum peak is "less than" the reference voltage, the detector 82 emits a positive voltage signal. In other words, the detectors 81, 82 perform a comparison function and the integrator 86 performs an integration function that results in a reference voltage that is returned to the detectors 81, 82 and thus serves as a level for use in comparing subsequent upper or maximum peaks contained in the input or feedback signal that is impressed on the terminal 56.

The two detectors 83, 84 are employed to detect the lower or minimum peaks included in the feedback signal forwarded to the terminal 56 and in turn impressed on the inputs 83a and 84a. As already indicated, the detectors 83, 84 are complements of the detectors 81, 82, respectively, which are used for upper or maximum peak detection. Hence, the peak integrator 90 is actually identical to that of the upper or maximum peak portion of the circuitry. Consequently, if the feedback minimum or lower peak is greater (less positive or more negative) than the reference signal derived from the peak integrator 90, a positive output voltage pulse appears at the output 83c which causes the integrator 90 to integrate negatively to attain the same magnitude as the minimum peak. By the same token, if the minimum peak amplitude of the feedback voltage is less (more positive or less negative) than the reference voltage furnished by the integrator 90, the detector 84, which functions as a "lower peak less than" detector will provide a negative output voltage pulse at its output 84c with the consequence that the integrator 90 integrates in a positive direction to achieve the same magnitude as the minimum peak present in the feedback signal. Owing to the gating pulse, this pulse activating the detector 84 in the same manner as it activates the detector 82, the detector 84 puts out a negative pulse at its ouput 84c having a pulse width influenced by the width of the gating or activating signal and an amplitude depending upon how much less in magnitude the minimum peak of the feedback voltage is than the reference voltage received from the peak integrator 90. The output pulse at the output 83c of the detector 83, though, will have an amplitude and width in accordance with the degree to which the feedback signal exceeds in a negative direction the integrator output that serves as the reference signal for the two detectors 83, 84.

Since the output signal from the peak integrator 86 is representative of the amplitude of the maximum peaks of the feedback voltage, this same voltage being the reference voltage that has been hereinbefore mentioned, an auxiliary terminal 100 is provided to which a peak recorder or other instrument can be connected. In like manner, a terminal 102 is provided which is connected directly to the output of the peak integrator 90. Thus, when expedient to record signals at this stage, the auxiliary terminals 100, 102 allow this to be done.

Reference will now be made to a span difference amplifier labeled 104 having a first input 104a and a second input 104b. The input 104a is coupled to the output of the integrator 86 by means of a resistor 106, and the input 104b is similarly connected to the output of the integrator 90 through a resistor 108. A resistor 109 is part of the feedback network which sets the gain of the amplifier 104. In this way, the input 104a of the amplifier 104 is subjected to a direct current voltage whose magnitude and polarity are equal to the magnitude and polarity of the maximum or upper peaks of the feedback of input voltage at terminal 56. On the other hand, the second input 104b is subjected to a D.C. voltage corresponding to the magnitude and polarity of the minimum or lower peaks of the feedback or input voltage. The output voltage from the amplifier 104 will be a D.C. voltage that will correspond directly to the peak-to-peak amplitude of the feedback or input voltage. In order to make this voltage available for external use, another auxiliary terminal 110 is provided.

The output of amplifier 104 is connected through a resistor 114 to a rate control unit 116 composed of adjustable resistors 116a and 116b. The purpose of the rate control unit 116 is to control the integration rate of a difference integrator 118 having inputs 118a and 118b, the unit 116 providing an adjustable input impedance for the integrator and thus really being part of the integrator itself. This will allow, as far as a materials testing system is concerned, achievement of an optimum control rate for a given test. Actually, other controls are necessary in conjunction with a practical materials testing system, such as the system 10 herein briefly described, which will effectively disable the amplitude control circuit 54 without disrupting the operation of the test system and suitable control circuitry must also be incorporated into a system such as the system 10 to be used for an automatic start-up. However, these additional control features are indeed refinements as far as the present invention is concerned because they deal with the specific system and not with the circuit 54 as such.

Figure 2:
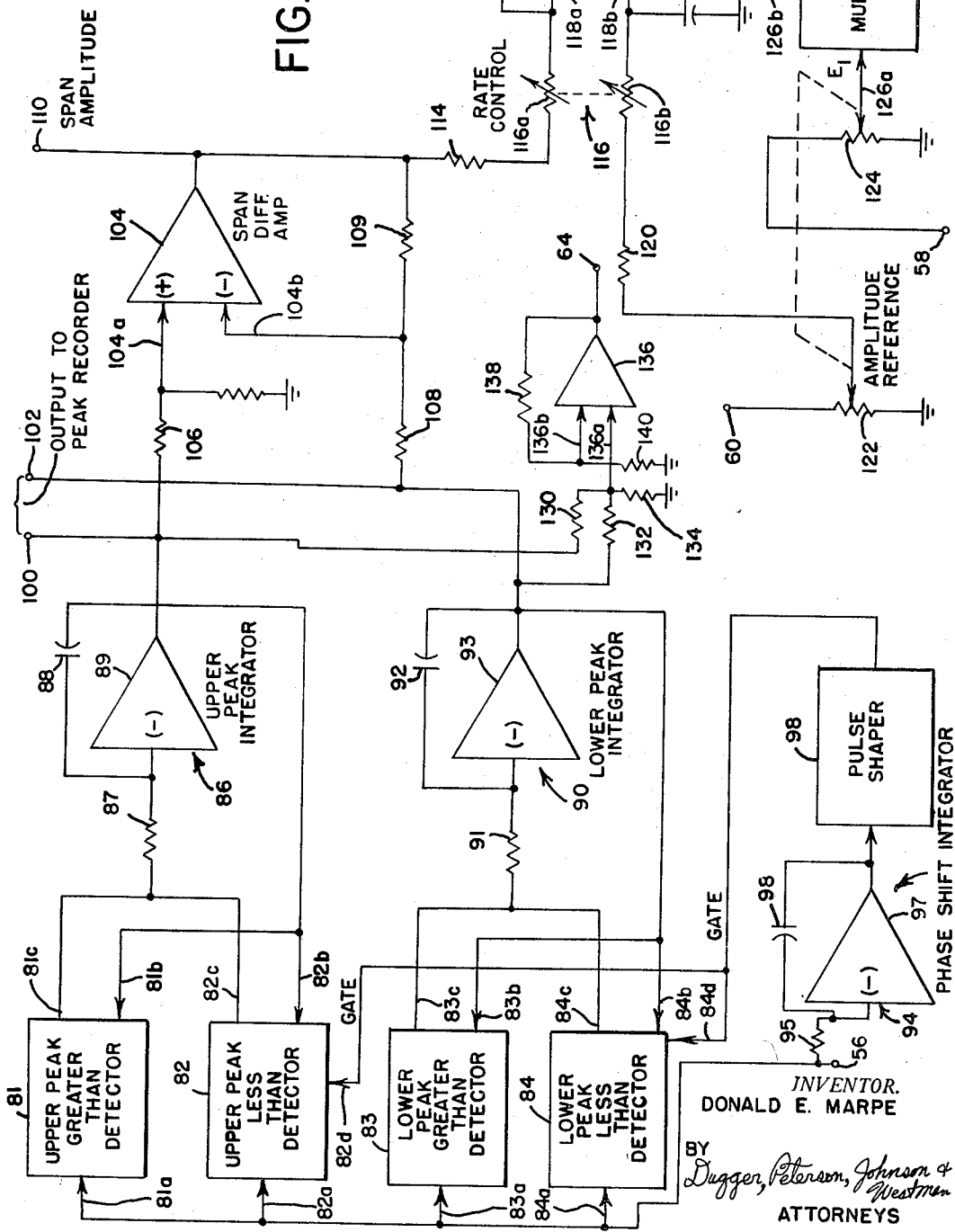
FIGURE 2 is a combined block and schematic diagram illustrating in detail the components comprising my amplitude control circuit.

It will be discerned from FIGURE 2 that the adjustable resistor 116b of the rate control unit 116 is connected through a dropping resistor 120 to an adjustable resistor 122 which is in turn connected to the terminal 60 that supplies a reference voltage to the circuit. Closely associated with the adjustable resistor 122, which supplies an amplitude reference signal, is an adjustable resistor 124 that supplies a span control signal. Actually, the wipers of the adjustable resistors 122, 124 are ganged together so as to be movable in unison or in a preferred relationship with each other. The adjustable resistor 124, it will be noted, is connected in circuit with the terminal 58 and thereby with the function generator 52.

The function generator 52 provides a dynamic command voltage signal which is delivered to a multiplier 126 via a first input 126a. The output from the difference integrator 118 is connected to a second input 126b of the multiplier 126.

What the multiplier 126 does is to multiply a command signal voltage obtained from the adjustable resistor 124 with a control voltage obtained from the output of the difference integrator 118. The voltage from the difference integrator 118 represents the integration of the difference or error voltage which exists between the two inputs 118a, 118b of this integrator. Since the input 118a is connected to the output of the span difference amplifier 104 through the resistors 114 and 116a, the voltage derived and which is impressed on the input 118a has a magnitude equal to the peak-to-peak amplitude of the feedback or input voltage at the terminal 56. The second input 118b has a D.C. reference voltage which is proportional to the required feedback amplitude.

If the derived voltage appearing at the input 118a of the difference integrator 118 is less than the reference voltage appearing at the input 118b, the error voltage to this integrator 118 will be negative, causing it to integrate in a positive direction to increase the voltage output from the integrator and which voltage is impressed on the input 126b of the multiplier 126. Any such increase at the input 126b will increase the output signal from the multiplier 126 which is used as the controlled command voltage, this being the voltage at the terminal 62. This increase in command voltage will correct the feedback voltage. If the derived voltage at the input 118a is greater than the amplitude reference voltage at the input 118b, the error signal will be positive, resulting in a negative integrator output which reduces the magnitude of the signal fed to the input 126b. Such action will reduce the magnitude of the command voltage at the terminal 62 and consequently the feedback voltage will be decreased. Therefore, it will be readily apparent that the multiplier 126 effectively multiplies a command signal voltage which is delivered thereto via the input 126a with a control voltage that is delivered thereto via the input 126b, the resulting output voltage from the multiplier 126 appearing at the terminal 62 as already explained.

With the selector switch 66 of FIGURE 1 set for non-resonant operation, it follows that any command voltage appearing at the terminal 62 will be applied to the load controller 44 through the agency of the normally closed contacts 72, since the relay 70 is at this time de-energized. Also, since the normally closed contacts 74 are closed, the signal from the transducer signal conditioner 50 is applied directly to a second input of the load controller 44. The load controller 44 sums these signals but the summing action, together with the introduction of a set point control and other refinements peculiar to materials testing, as well as other closed loop systems, are not believed necessary to an understanding of the manner in which my amplitude control circuit functions.

With the selector switch 66 adjusted to its lower position for operation in the resonant mode, the relay 70 picks up its normally open contacts 76 and 78, thereby connecting the terminal 62 to the load controller 46 and the terminal 64 to the load controller 48, the contacts 74 being open so as to eliminate the bypassing action accomplished when the contacts 74 are closed; likewise, the contacts 72 are pulled open so that the terminal 62 is no longer connected to the load controller 44, instead being connected only to the load controller 46.

Having prefaced the operational description to the extent given above, reference should now be made once again to FIGURE 2 where means for averaging the output voltage signals from the integrators 90 and 92 appear. It will be recalled that the signal at the output of the integrator 90 is in accordance with the maximum peaks of the feedback or input signal and that the signal appearing at the output of the integrator 92 is representative of the magnitude of the minimum peaks. The average value of the dynamic feedback amplitude is needed to reduce control errors due to waveform distortion when operating in the resonant mode. In other words, the minimum peaks may not be the true reflections of the maximum peaks. The averaging portion of the circuitry therefore is important. To provide a voltage that is in accordance with the average, the voltage signals from the integrators 90, 92 are summed by a resistance network which includes resistors 130, 132 and 134, the latter leading to ground from the junction of the resistors 130, 132. Also included in this portion of the circuitry is an amplifier 136, preferably a difference amplifier having a first input 136a and a second input 136b. Resistors 138 and 140 establish the gain of amplifier 136. The output of the amplifier 136 is connected directly to the previously mentioned terminal 64 which is used to supply a mean load control signal to the load controller 44 through the normally open contacts 78 which are closed when the relay 70 is energized for resonant operation of the system 10. Consequently, irrespective of the amount of distortion, say, in the minimum peaks as contrasted with the maximum peaks, a direct current voltage is impressed on the terminal 64 that is representative of the average peak condition of the feedback voltage signal.

Prior to describing the detectors circuits 81–84 in more detail, it will perhaps be well to briefly state the operation of the system 10. With the information given hereinbefore, it should be readily apparent that the amplitude control circuit 54 is responsible for delivering both a controlled command voltage via the terminal 62 and a voltage signal representative of the average of the positive and negative peaks of the feedback voltage to the terminal 64. In one instance, this being the non-resonant operation of the system, the command signal appearing at the terminal 62 is delivered to the load controller 44 and in the resonant type of operation, it is delivered to the load controller 46. Also, when operating in the non-resonant mode, the signal from the transducer conditioner 50 is impressed directly on one of the inputs of the load controller 44 as well as being delivered to the terminal 56. When operating to the resonant mode, the situation is changed to the extent that the signal appearing at the terminal 62 is fed to the load controller 46 and the signal appearing at the terminal 64 is delivered to the load controller 44, this rendering both load controllers 44, 46 active so as to operate both servovalves 40, 42, whereas in the non-resonant situation, only the load controller 44 is effective to control the servovalve 40.

As earlier indicated, the purpose of the detector circuit 81 is to compare the maximum peak amplitude of the feedback voltage applied to the terminal 56 with a D.C. reference voltage from the integrator 86, the reference voltage representing the maximum peak amplitude. If the actual maximum peak amplitude exeeds (becomes more positive than) the reference voltage, an output signal is obtained from this circuit which is used to correct this reference voltage.

Figure 3:
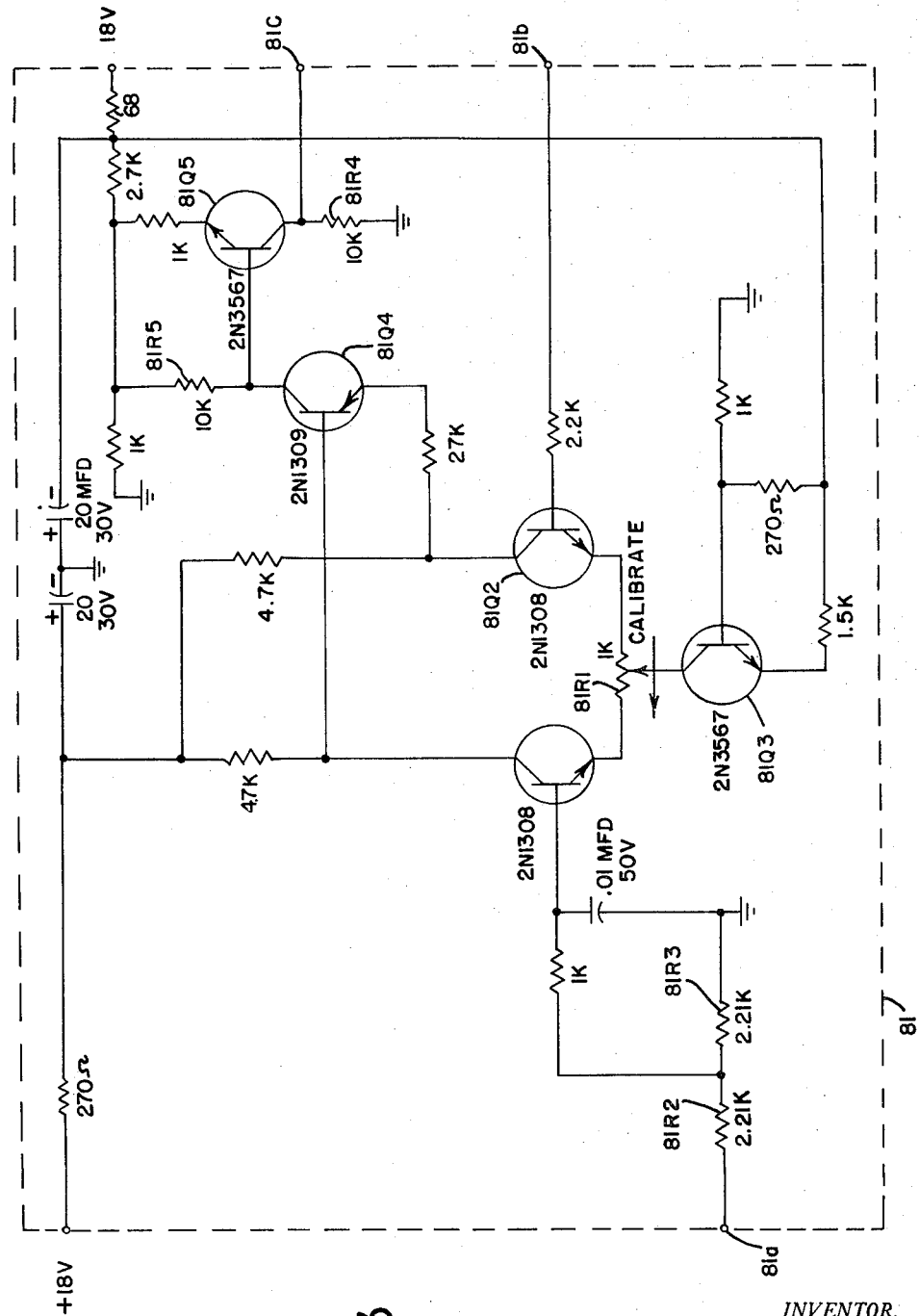
FIGURES 3–6 are schematic diagrams illustrating the specific components constituting the various detectors appearing in FIGURE 2.

It is believed advisable to submit a schematic diagram depicting the detector circuit 81 and therefore reference should now be made to FIGURE 3 for the circuit details relating to the detector 81. First of all, it should be appreciated that the operation of the circuit 81 makes use of the principle that under certain conditions the output voltage from a differential amplifier is the product of a constant and the difference between two input signal voltages. These particular conditions are established by providing a balancing potentiometer labeled 81R1 for balancing the differential amplifier made up of transistors 81Q1 and 81Q2, and additionally by providing a constant current source in the form of a transistor 81Q3 for the emitter current supply to the transistors 81Q1, 81Q2.

The differential output voltage from the transistors 81Q1, 81Q2, which is the potential difference between the collectors of transistor 81Q1 and transistor 81Q2, is converted to a single ended output by means of additional amplifier stages comprised of a transistor 81Q4 and a transistor 81Q5. The method of applying the signal to the transistor 81Q4 maintains the advantages and properties of the differential amplifier with regard to temperature effects and the relationship of the output voltage to the input voltages.

It will be discerned from FIGURE 3 that the inputs 81a and 81b have been identified, as well as the output 81c. This should prove of benefit in orienting the components that have been referred to above and also in appreciating that the feedback or input voltage which is impressed on the terminal 81a to the detector circuit 81 is by means of an input attenuator comprised of resistors 81R2 and 81R3. The purpose of the attenuator is to scale the feedback voltage to a desired value because of certain voltage limitations in the span difference amplifier 104 shown in FIGURE 2.

If the feedback voltage at the terminal 81a is always less positive than the reference voltage supplied to terminal 81b, the transistor 81Q2 will conduct more than the transistor 81Q1 which results in the collector of transistor 81Q2 being more negative than the collector of the transistor 81Q1. Therefore, the emitter of the transistor 81Q2 will be more negative than the base of the transistor 81Q4 and since the transistor 81Q4 is a PNP type, it will be held in its cut-off condition. With the transistor 81Q4 non-conducting, the base and emitter of the transistor 81Q5 will be referenced to the same potential and the transistor 81Q5 will also be held in its cut-off or non-conducting condition. Preferably, the transistor 81Q5 is a silicon type device having a very low $I_{CBO}$ leakage, and consequently the potential developed across a resistor 81R4 will be near zero volts.

If any of the portion of the feedback voltage or input signal applied to the terminal 81a becomes equal to the reference voltage applied to the terminal 81b, the transistors 81Q1 and 81Q2 will conduct equally during that time and the base-to-emitter junction of the transistor 81Q4 will be zero biased, or slightly forward biased. If any portion of the feedback signal becomes more positive then the reference voltage by a slight amount, the transistor 81Q1 will conduct more than the transistor 81Q2 so that the collector of the transistor 81Q1 will become more negative than the collector of the transistor 81Q2. Inasmuch as this condition will forward bias the base to the emitter junction of the transistor 81Q4, it will begin to conduct. The collector current from the transistor 81Q4 will develop a positive potential across a resistor 81R5 which will forward bias the transistor 81Q5, since its base will now be more positive than its emitter. Conduction of the transistor 81Q5 will result in a potential being developed across the resistor 81R4 which will be negative with respect to ground. Therefore, the circuit 81 will function as a detector of all voltages which are greater than, that is, more positive than, a given reference voltage, the given reference voltage being supplied by the integrator 86.

Describing now the detector circuit 82, it will be recalled that the purpose of this circuit is to compare the maximum peak amplitude of the feedback voltage at the terminal 56 with a D.C. reference voltage which is the same reference voltage as that supplied to the detector 81 and to provide an output voltage which may be used to correct the reference voltage if the maximum peak amplitude is less than the reference voltage.

Figure 4:
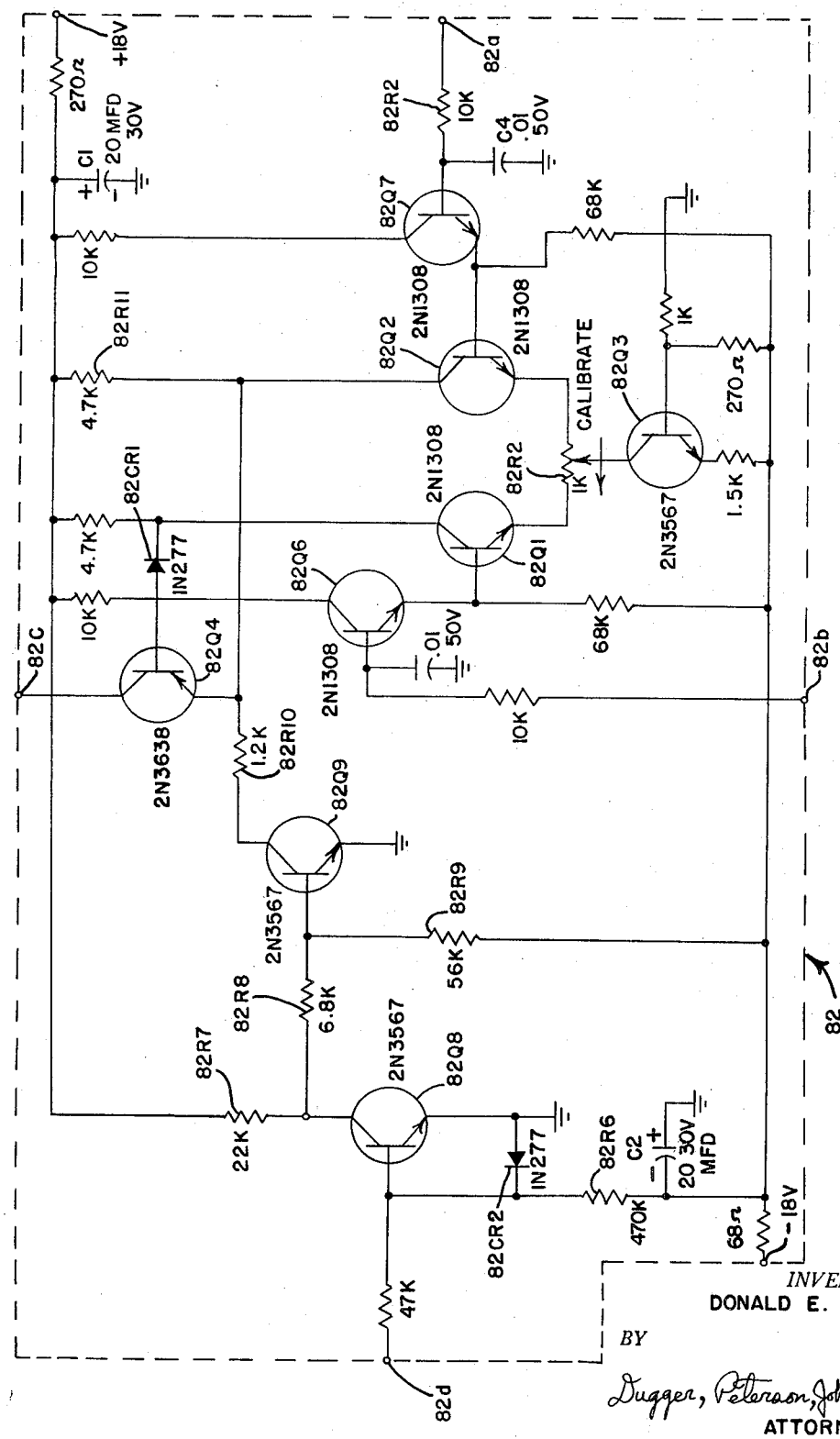

Actually, the detector circuit 82, which is presented in FIGURE 4, is basically similar to the circuit 81 since by interchanging the inputs to the basic circuit, it is possible to have the circuit detect voltages which are less than a particular reference voltage. It may be of assistance in understanding the circuit 82 to mention that there are two considerations which require this circuit to be different from the detector circuit 81, aside from reversing the input connections. These differences are:

(1) The only portion of the feedback signal at the terminal 56 that is of interest is the upper or maximum peak value. All other portions of this signal are less than that peak. Therefore, to detect successfully a peak that is less than a given voltage, the detector circuit 82 must be inhibited for all parts of the alternating cycle except the upper peak.

(2) The output of the circuit 82 must be a voltage of the opposite polarity from that obatined from the detector 81 since an opposite reaction or contribution is desired.

To obtain an output voltage at the output labeled 82c which is opposite in polarity to that at the output 81c of the detector 81, a single stage of amplification connects the differential stage to the output 81c in the present instance. To provide a ready comparison between the circuit 82 and the circuit 81, the single amplifying stage constitutes the transistor 82Q4, whose emitter is tied to the collector of the transistor 82Q2 and whose base is connected to the collector of the transistor 82Q1 through a diode 82CR1. The purpose of the diode 82CR1 is to protect the base-to-emitter junction of the transistor 82Q4 when circuit conditions cause the potential difference between the collectors of the transistors 82Q1, 82Q2 to exceed the $BV_{EBO}$ rating of the transistor 82Q4. It is to be observed that the collector load resistor is resistor 81R4, which is shared with detector 81.

To inhibit operation of the circuit 82 except at the feedback voltage maximum peaks, gating circuitry consisting of the transistors 82Q8 and 82Q9 is utilized. For zero volts gate input, or with the absence of a positive going pulse at the gate terminal 82d, the transistor 82Q8 will be cut off because of the bias network made up of resistors 82R5 and 82R6 plus the diode 82CR2. With the transistor 82Q8 non-conducting, the bias network comprising the resistors 82R7, 82R8 and 82R9 will cause the transistor 82Q9 to be driven to saturation. Conduction of the transistor 82Q9 through the resistors 82R10 and 82R11 will clamp the emitter of the transistor 82R1 to a specified positive voltage, actually in practice +3.5 volts. Since the transistors 82Q1 and 82Q2 have their emitters driven from a constant current source, this being the transistor 82Q3, no input condition will result as far as the collector of the transistor 82Q1 is concerned and consequently the base of the transistor 82Q4, being more negative than the potential to which the emitter of the transistor 82Q4 is being clamped. Hence, the output voltage at the output 82c will remain at zero volts regardless of what the input voltages are at the inputs 82a and 82b.

If a narrow positive pulse of a given amplitude, more specifically, +4 volts, and timed to occur at the maximum peak of the feedback voltage, is applied to the gate terminal 82d, the transistor 82Q8 will turn on and be driven into saturation. The bias network comprising the resistors 82R8 and 82R9 will turn the transistor 82Q9 off, which releases the clamp on the emitter of the transistor 82QR and the circuit 82 will be allowed to function as a voltage detector.

If, while the clamping action of the transistor 82Q9 is removed, the feedback voltage becomes greater than, that is, more positive than, the reference voltage at the input 82b, the transistor 82Q2 will conduct more than the transistor 82Q1 and as a consequence the emitter of the transistor 82Q4 will be more negative than the base. This will result in zero volts at the output 82c since the transistor 82Q4 will be biased to cut off. However, if the feedback maximum peak amplitude is less than the reference voltage applied to the input 82b, the collector of the transistor 82Q1 will be more negative than that of the transistor 82Q2, which forward biases the transistor 82Q4 into conduction. Current flow through the load resistor 81R4 (shown as part of detector 81) will be such that a positive potential will be developed at the output 82c, which is the desired reaction of the circuit.

The purpose of the transistors 82Q6 and 82Q7 is to provide isolation between the differential portion of the circuit comprised of the transistors 82Q1 and 82Q2 and the circuitry providing the feedback input voltage at the input 82a since loading by the circuit will occur under some conditions during the time the transistor 82Q9 is clamping the differential output. As described above for the circuit 81, the function of the calibrate control potentiometer 82R1 is to balance the circuit conditions to provide an output signal whenever the feedback voltage applied to the input 82a is slightly less than the reference voltage applied to the input 82b.

Figure 5:
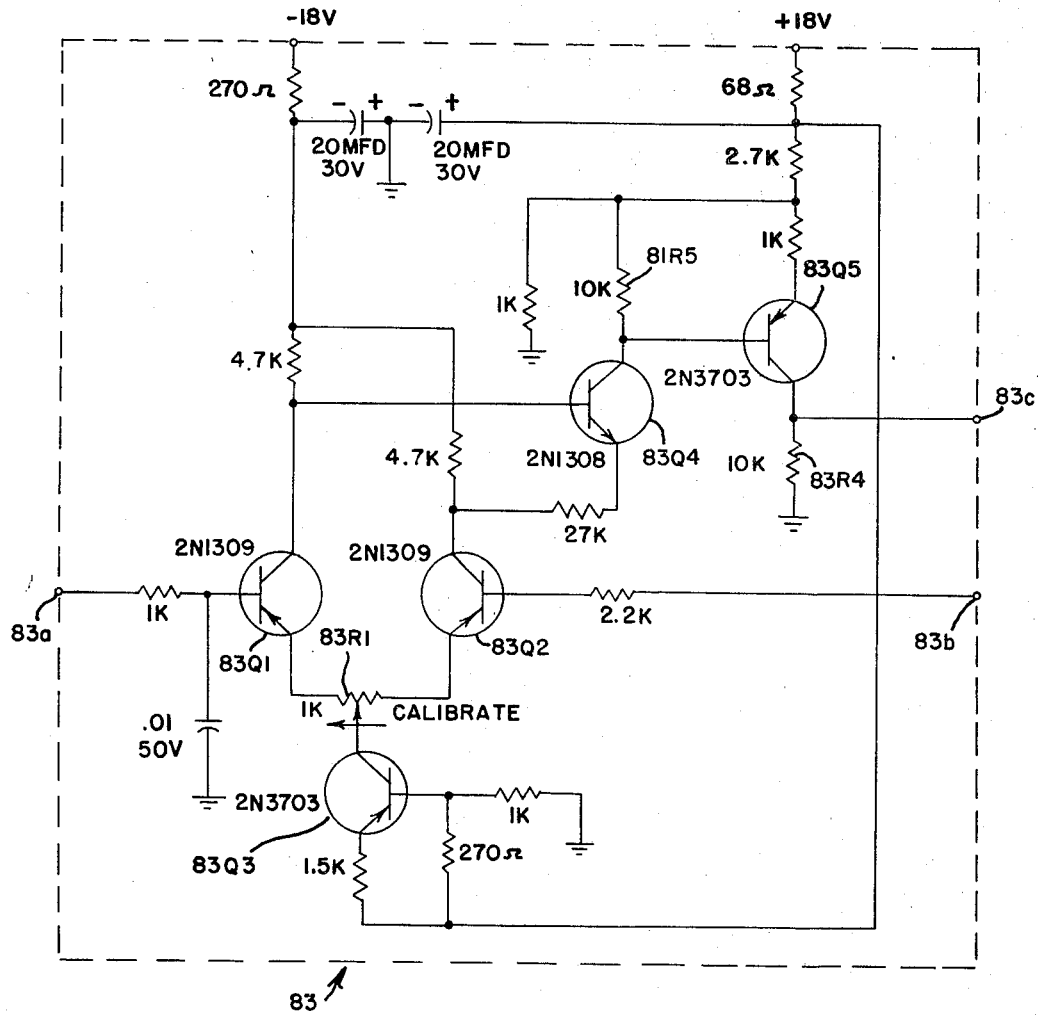
Figure 6:
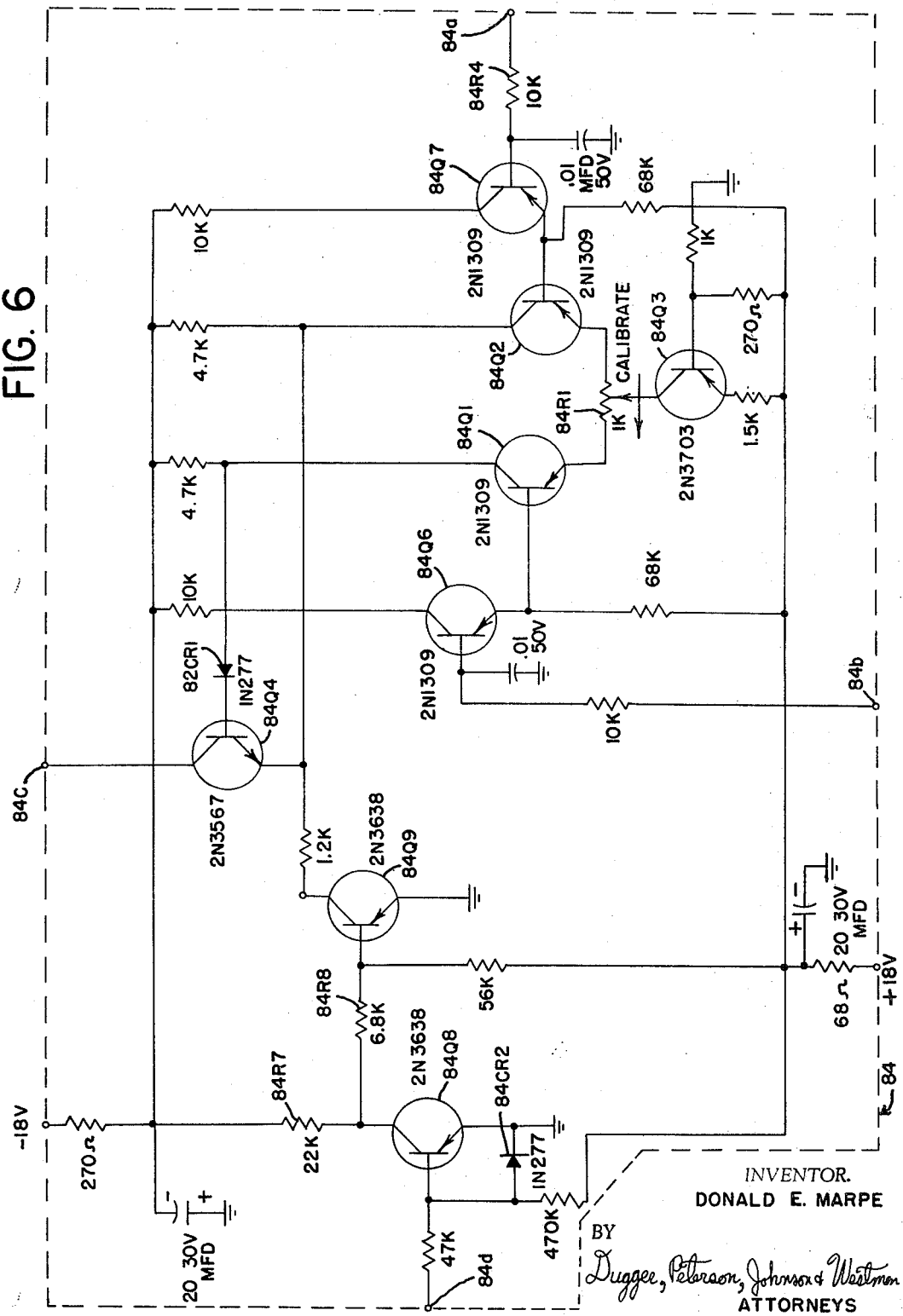

The detector circuit 83 is presented schematically in FIGURE 5 and as previously indicated, the purpose of this circuit is to compare the minimum peak amplitude of the feedback voltage with a D.C. reference voltage which represents the minimum peak amplitude. If the actual minimum peak amplitude is greater than, that is, more negative than, the reference voltage, a signal is obtained at the output 83c of this circuit which is used to correct the reference voltage. The circuit 83 is a true complement of the circuit 81 and functions is an identical manner to said circuit. However, it should be readily apparent that all voltage polarities for the circuit 83 are of opposite polarity to those of the circuit 81. The prefix 83 has been substituted for the prefix 81 in FIGURE 3 and the system of suffixes should allow an easy comparison of components.

It has been previously stated that the purpose of the detector circuit 84 is to compare the minimum peak amplitude of the feedback voltage with a D.C. reference voltage and to provide an output voltage which may be used to correct the reference voltage if the minimum peak amplitude is less than, that is, more positive than, the reference voltage. In this instance, the circuit 84 is a true complement of the circuit 82, and as such, functions in an identical manner to the circuit 82. Once again, though, all voltage polarities are opposite in the circuit 84 from those required in the circuit 82. Since the prefix 84 appears instead of the prefix 82, the two circuits can be readily compared.

I claim:

1. An amplitude control circuit comprising a first detector circuit having first and second inputs and an output for providing an output voltage signal at said output whenever an input voltage signal applied to said first input is greater than a reference voltage signal applied to said second input, a second detector circuit having first and second inputs and an output for providing an output voltage signal at its said output when a voltage applied to its first input is less than a voltage applied to its second input, the voltage applied to the first input of said second detector circuit corresponding to said input voltage signal and the voltage applied to the second input of said second detector circuit corresponding to said reference voltage signal, and an integrator circuit having an input connected to the outputs of said detector circuits and an output connected to the second inputs of said detector circuits, whereby said integrator circuit integrates the resultant of said output voltage signals to provide said reference voltage signal at its said output and also at the second inputs of said detector circuits.

2. An amplitude control circuit as set forth in claim 1 in which said integrator circuit increases said reference voltage when said reference voltage is less than said input voltage and decreases said reference voltage when said reference voltage is greater than said input voltage.

3. An amplitude control circuit as set forth in claim 1 in which said output voltages are of opposite polarity.

4. An amplitude control circuit as set forth in claim 1 in which said output voltages are pulses, said first detector circuit providing an output pulse of opposite polarity from that of said input voltage when said input voltage is greater than said reference voltage and said second detector circuit providing an output pulse of the same polarity as that of said input voltage when said input voltage is less than said reference voltage, and said integrator circuit integrating in a polarity direction opposite to that of the voltage appearing at its input so that said integrator circuit integrates in a direction to reduce the difference between said reference voltage and said input voltage.

5. An amplitude control circuit as set forth in claim 4 in which said second detector circuit includes a gate terminal, said second detector circuit providing an output only when a voltage is applied to said gate terminal, and means for applying an activating voltage to said gate terminal only during amplitude peaks of said input voltage.

6. An amplitude control circuit as set forth in claim 5 including a third detector circuit, which is the complement of said first detector circuit, having first and second inputs and an output, said input voltage being applied to the first input of said third detector circuit and a second reference voltage being applied to the second input of said third detector circuit, so that an output pulse of opposite polarity from the output pulse of said first detector circuit appears at the output terminal of said third detector circuit during reverse amplitude peaks of said input signal when said input voltage is greater than said second reference voltage, a fourth detector circuit, which is the complement of said second detector circuit, having first and second inputs, an output and a gate terminal, said input voltage being applied to the first input of said fourth detector circuit, said second reference voltage being applied to the second input of said fourth detector circuit and said activating voltage being applied to the gate terminal of said fourth detector circuit, so that an output pulse of opposite polarity from the output pulse of said second detector circuit appears at the output of said fourth detector circuit during reverse amplitude peaks when said input voltage is less than said second reference voltage, and a second integrator circuit having an input connected to the outputs of said third and fourth detector circuits and an output connected to the second inputs of said third and fourth detector circuits, whereby said second integrator circuit integrates the resultant of the output pulses from said third and fourth detector circuits to provide said second reference voltage at its said output and also at the second inputs of said detector circuits.

7. An amplitude control circuit as set fourth in claim 6 including summing means connected to the outputs of said integrator circuit for providing a voltage signal representative of the average of the positive and negative peak amplitudes of said input voltage.

8. An amplitude control circuit as set forth in claim 6 in which said means for applying an activating voltage to said gate terminals includes a phase shift integrator having an input and output, the input of said phase shift integrator having said input voltage applied thereto and the output of said phase shift integrator being connected to said gate terminals.

9. An amplitude control circuit as set forth in claim 8 in which said means for applying an activating voltage to said gate terminals further includes a pulse shaper connected between the output of said phase shift integrator and said gate terminals.

10. An amplitude control circuit as set forth in claim 6 including a difference amplifier having a pair of inputs connected to the outputs of said integrator circuits and having an output at which appears a voltage representative of the peak-to-peak amplitude of said input voltage.

11. An amplitude control circuit as set forth in claim 10 including a difference integrator having a pair of input terminals and an output terminal, one of the input terminals of said difference integrator being connected to the output of said difference amplifier, and means for supplying an amplitude reference voltage, the other of the inputs of said difference integrator being connected to said amplitude reference means.

12. An amplitude control circuit as set forth in claim 11 including means for supplying a command voltage, a multiplier having a first input connected to the output of said difference integrator, a second input connected to said command voltage supply means and having an output at which appears a voltage representative of the product of the voltage applied to its said inputs.

References Cited

UNITED STATES PATENTS 2,965,889   12/1960   Cook  ---------- 328—150 XR
3,431,501   3/1969   David et al.  ----- 328—127 XR STANLEY D. MILLER, Primary Examiner S. T. KRAWCZEWICZ, Assistant Examiner U.S. Cl. X.R.

307—229, 264; 328—96, 127, 147, 150

PO-1050
(5/69)

UNITED STATES PATENT OFFICE
CERTIFICATE OF CORRECTION

Patent No. 3,508,159          Dated April 21, 1970

Inventor(s) Donald E. Marpe

It is certified that error appears in the above-identified patent and that said Letters Patent are hereby corrected as shown below:

Column 10, line 14, "obatined" should be --obtained--.
Column 12, line 52, "circuit" should be --circuits--.

SIGNED AND
SEALED
AUG 25 1970

(SEAL)
Attest:

Edward M. Fletcher, Jr.
Attesting Officer

WILLIAM E. SCHUYLER, JR.
Commissioner of Patents